United States Patent [19]

Gokimoto et al.

[11] Patent Number: 4,627,656
[45] Date of Patent: Dec. 9, 1986

[54] SEAT FOR AUTOMOBILE

[75] Inventors: Hiroyuki Gokimoto; Isao Kiyomitsu, both of Hiroshima, Japan

[73] Assignees: Mazda Motor Corporation; Delta Kogyo Co., Ltd., both of Japan

[21] Appl. No.: 719,140

[22] Filed: Apr. 2, 1985

Related U.S. Application Data

[63] Continuation of Ser. No. 410,637, Aug. 23, 1982, abandoned.

[30] Foreign Application Priority Data

Aug. 26, 1981 [JP] Japan ............................. 56-133720
Sep. 4, 1981 [JP] Japan ............................. 56-140063

[51] Int. Cl.$^4$ .................... B60N 1/02; A47C 13/00
[52] U.S. Cl. ............................ 296/65 R; 297/336; 297/366; 297/379
[58] Field of Search ............ 296/65 R; 297/331, 335, 297/336, 341, 366, 379; 105/314, 315, 316; 5/28, 43, 44 R, 46 R

[56] References Cited

U.S. PATENT DOCUMENTS 3,957,312  5/1976  Bonnaud .................... 297/341
4,043,593  8/1977  Turner ........................ 297/341
4,268,086  5/1981  Okuyama ................ 297/379 X
4,269,446  5/1981  Gersmann et al. ......... 297/341
4,368,916  1/1983  Blasin ........................ 265/65 R
4,484,776  11/1984 Gokimoto et al. ........ 265/65 R

FOREIGN PATENT DOCUMENTS 2434409  2/1975  Fed. Rep. of Germany .... 296/65 R

Primary Examiner—Robert B. Reeves
Assistant Examiner—Russell D. Stormer
Attorney, Agent, or Firm—Gerald J. Ferguson, Jr.; James E. Bryan; Michael P. Hoffman

[57] ABSTRACT

An automobile seat comprising a seat bottom rotatable around a transverse axis approximately parallel to a car body floor, a seat back inclinably mounted on the seat bottom, a seat bottom lock for releasably locking the seat bottom to the floor, a seat back lock for releasably locking the seat back to the seat bottom, and a link for interlocking these locks in such a manner that, when one of them is released, the other is automatically released. The seat bottom lock is provided with a striker fixed to the floor and a lock piece mounted on the seat bottom for engagement with the striker and the seat back lock is provided with a hook for locking the rotation of the seat back. The link transmits the movement of either the lock piece or the hook to the other. In a reclining seat, the seat back lock is formed to releasably lock a knuckle bracket of the reclining mechanism to the seat back or the seat bottom.

9 Claims, 7 Drawing Figures

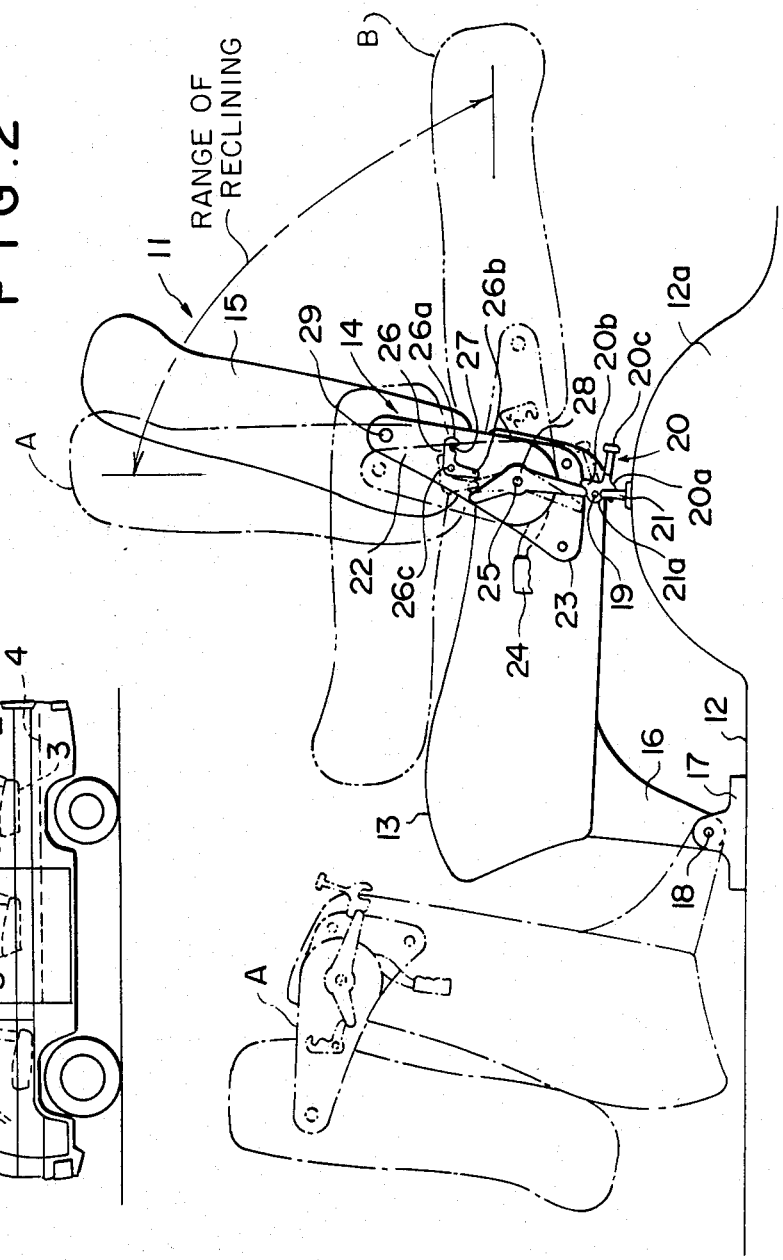

FIG. 2B
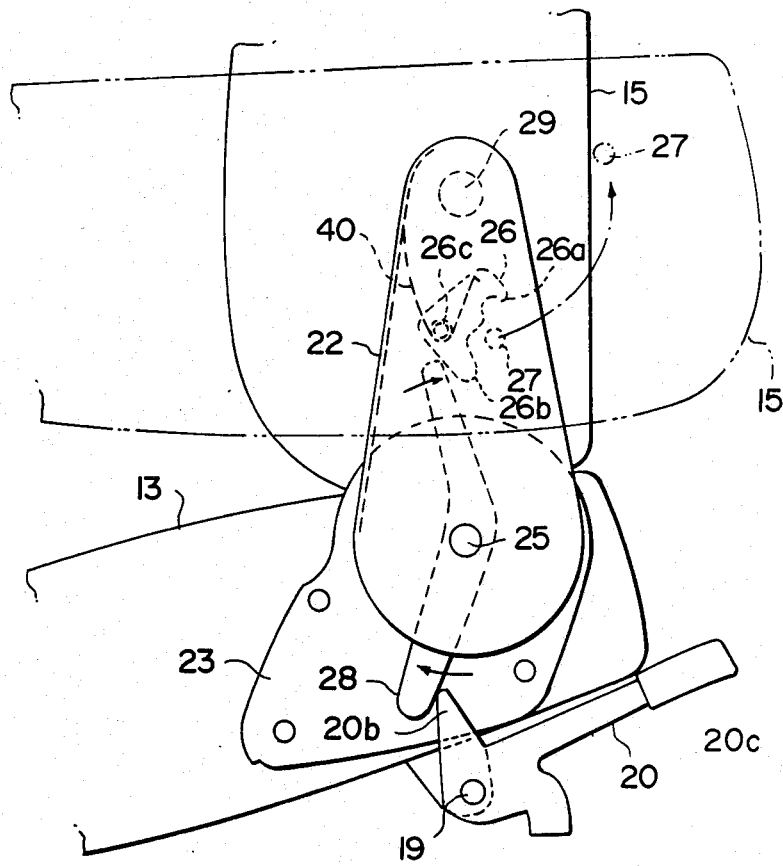
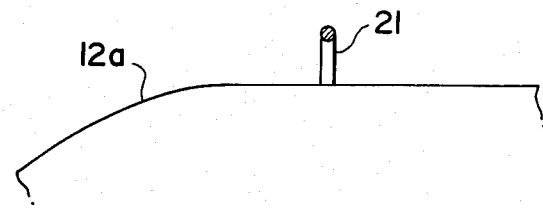

SEAT FOR AUTOMOBILE

This is a continuation application of Ser. No. 410,637, filed Aug. 23, 1982, now abandoned.

BACKGROUND OF THE INVENTION

1. Field of the Invention

This invention relates to an automobile seat, and more particularly to an improvement of an automobile seat the seat back of which can be inclined forwards with respect to the seat bottom and stored together with the seat bottom in front of the original position of the seat bottom.

2. Description of the Prior Art

In multipurpose one-box cars and vans used, for example for carrying persons and goods, the seats are formed so that they can be stored in folded condition to make available large spaces for loading cargo. In general, to obtain a larger space for cargo, the seat back for supporting the back of a person is inclined forwards on the seat bottom and then the seat bottom supporting the inclined seat back is rotated forwards and stored together with the seat back so as to leave a wide space behind the seat. The automobile seat of this type is widely used. However, to fold and store the conventional automobile seat comprising the forward-rotating type seat bottom, a seat back lock for releasably locking the seat back to the seat bottom must first be released to incline the seat back forwards, and then a seat bottom lock for releasably locking the seat bottom to the floor of the car body must be released to rotate the seat bottom forwards. Namely, it is necessary to perform two lock releasing operations to incline the seat back forwards and to rotate the seat bottom forwards. Thus, the operations for folding and storing the conventional seat comprising the forward-rotating type seat bottom are very troublesome.

SUMMARY OF THE INVENTION

The primary object of the present invention is to provide an improved automobile seat having a forward-rotating type seat bottom.

Another object of the present invention is to provide an automobile seat capable of being rotated forwards and stored very easily to obtain a large space behind the seat.

The specific object of the present invention is to provide an automobile seat having a simple configuration, in which both forward, inclination of the seat back and forward rotation of the seat bottom can be achieved by one operation.

The automobile seat in accordance with the present invention comprises a seat bottom rotatable around a transverse axis approximately parallel to the car body floor, a seat back inclinably mounted on said seat bottom, a seat bottom lock for releasably locking said seat bottom to said floor, a seat back lock for releasably locking said seat back to said seat bottom, and a means for interlocking said seat bottom lock with said seat back lock in such a manner that, when one of these locks is released, the other is automatically released. In the present invention, the automobile seat is provided with a means for interlocking the seat bottom lock with the seat back lock so that both locks are released when one of them is released. Accordingly, the seat in accordance with the present invention can easily be folded and stored by a single operation. Furthermore, the configuration of the seat is very simple.

BRIEF DESCRIPTION OF THE DRAWINGS

FIG. 1 is a side view showing an ordinary one-box car,

FIG. 2 is a side view showing an embodiment of the automobile seat in accordance with the present invention, FIGS. 2A and 2B are enlarged side views showing part of the seat shown in FIG. 2, FIGS. 3 and 4 are side views showing an ordinary reclining mechanism.

DESCRIPTION OF THE PREFERRED EMBODIMENTS

Figure 2A:
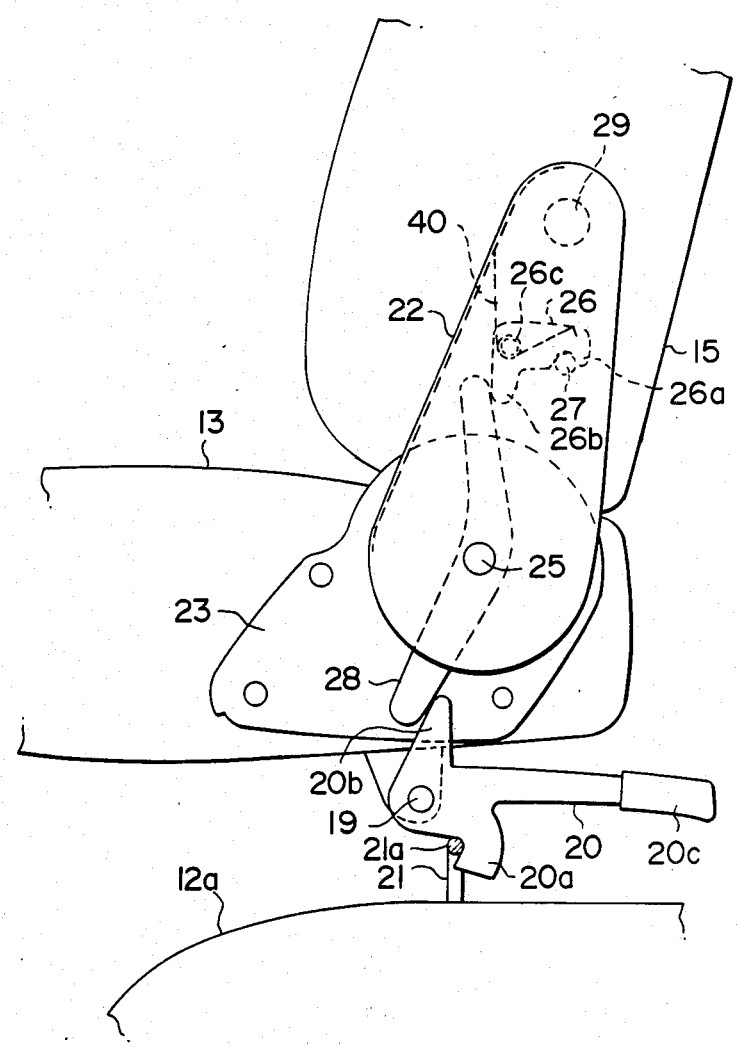

The present invention will hereinbelow be described in further detail with reference to the accompanying drawings.

FIG. 1 shows a one-box car or van of the type in generally use for various purposes, for example, for carrying persons and goods. In FIG. 1, a one-box car 1 contains rear seats 2 comprising seat backs 5 and seat bottoms 3. When a large cargo in loaded in the one-box car 1, the seat backs 5 are inclined forwards on the seat bottoms 3 and the seat bottoms 3 are then rotated forwards and stored in front of their original positions to obtain large spaces behind them. Reference numeral 4 designates the floor of the car body on which the seat bottoms 3 are supported.

FIG. 2 shows an embodiment of the automobile seat in accordance with the present invention. In FIG. 2, a seat 11 is used for example as the rear seat in a one-box car. The seat 11 has a seat bottom 13 mounted on a car body floor 12 and a seat back 15 inclinably coupled with the seat bottom 13 via a reclining mechanism 14. The seat bottom 13 is provided with a downward-extending leg 16 on the front side and the lower end of the leg 16 is supported on a support 17, which is fixed to the floor 12 by a pivot 18. The seat bottom 13 can be rotated around a transverse axis (pivot 18) which is approximately parallel to the floor 12.

FIGS. 2A and 2B are enlarged side views showing the section coupling the seat back 15 and the seat bottom 13 of the seat shown in FIG. 2. As shown in FIG. 2A, the seat comprises the seat back 15, the seat bottom 13, a lower bracket 23 fixed to the seat bottom 13, an upper bracket 22 rotatable around a shaft 25 with respect to the lower bracket 23, a shaft 29 around which the seat back 15 is rotated with respect to the upper bracket, and a lock pin 27 fixed to the seat back 15. The upper bracket 22 is supported on the lower bracket 23 via the reclining mechanism 14. The reclining mechanism 14 is formed so that, when a reclining control lever 24 shown in FIG. 2 is pulled up, the upper bracket 22 fixed to the seat back 15 is released from the lower bracket 23 fixed to the seat bottom 13 and can be rotated freely around the shaft 25. The upper bracket 22 is formed as a knuckle bracket to which a sector constituting a reclining knuckle lock mechanism is fixed. The configuration of such an ordinary reclining mechanism is shown in more detail in FIGS. 3 and 4. As seen in FIGS. 2A and 2B, on the lower side of the seat bottom 13 is mounted a lock piece 20 rotatable around a pin 19. The lock piece 20 has a hooking section 20a for releasably engaging with the rear side of a transverse shaft 21a of a striker fixed a tire house 12a of the floor 12, a protrusion 20b for contacting the rear side of the lower end of a rod 28 described later, and a grip 20c extending backwards. In the interior of the upper bracket 22 is provided a pin 26c on which a hook 26 is rotatably supported. The hook 26 has a hooking section 26a for releasably engaging with the lock pin 27 and a protrusion 26b for contacting the rear side of the upper end of the rod 28. The hook 26 is urged to rotate clockwise around the pin 26c by a spring 40 fitted on the pin 26c. Between the hook 26 and the lock piece 20 is positioned the rod 28 supported rotatably around the shaft 25.

When the seat shown in FIG. 2 is used for seating purposes, the lock piece 20 of the seat bottom 13 is engaged with the striker 21 fixed on the tire house 12a and maintained in a position approximately parallel to the floor 12 as shown in FIG. 2A. At this time, the rod 28 is in the position shown in FIG. 2A and does not restrain the clockwise rotation of the hook 26. Accordingly, the hook 26 urged to rotate clockwise by the spring 40 is engaged with the lock pin 27 of the seat back 15, and the seat back 15 is fixed to the upper bracket 22.

When the seat is to be folded and stored in front of its original position, the lock piece 20 is pulled up around the pin 19 and the hooking section 20a of the lock piece 20 is disengaged from the striker 21. When the lock piece 20 is operated in this way, the lower end of the rod 28 is pushed by the protrusion 20b of the lock piece, and the rod 28 is rotated clockwise around the shaft 25 into the position shown in FIG. 2B. As a result, the protrusion 26b of the hook 26 is pushed by the upper end of the rod 28, and the hook 26 is rotated counterclockwise around the pin 26c against the spring 40. Therefore, the hooking section 26a of the hook 26 is disengaged from the lock pin 27 of the seat back 15. In essence, the protrusion 20b, the rod 28 and the protrusion 26b interact to cause simultaneously actuation of hooking section 20a and hooking section 26a upon actuation of the lock piece 20. In this condition, the seat back 15 can be rotated around the shaft 29 with respect to the upper bracket 22 and completely folded forwards on the seat bottom 13 as indicated by the two-dot chain line in FIG. 2B. The seat is then rotated forwards or counterclockwise and stored in front of its original position as indicated by the chain line A in FIG. 2. When the seat is returned to its condition for use, the seat back 15 is first returned to its original position with respect to the upper bracket 22 as shown in FIG. 2A whereafter the seat bottom 13 is returned to the position shown in FIG. 2A. Alternatively the two operations can be carried out simultaneously. Thereafter, when the lock piece 20 is pushed down around the pin 19 so as to engage the hooking section 20a with the striker 21, the protrusion 20b of the lock piece 20 retracts away from the lower end of the rod 28. Accordingly, the hook 26 is rotated clockwise around the pin 26c by the spring 40, while the protrusion 26b of the hook 26 pushes the upper end of the rod 28. In this way, the hooking section 26a of the hook 26 is engaged with the lock pin 27.

Figure 3:
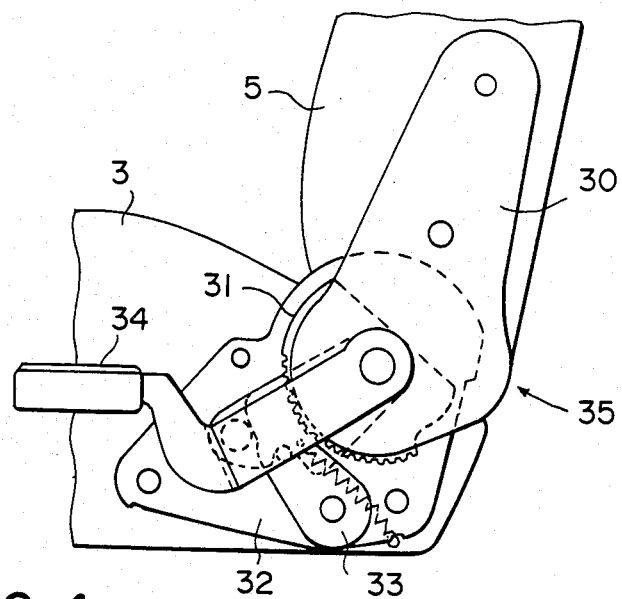
Figure 4:
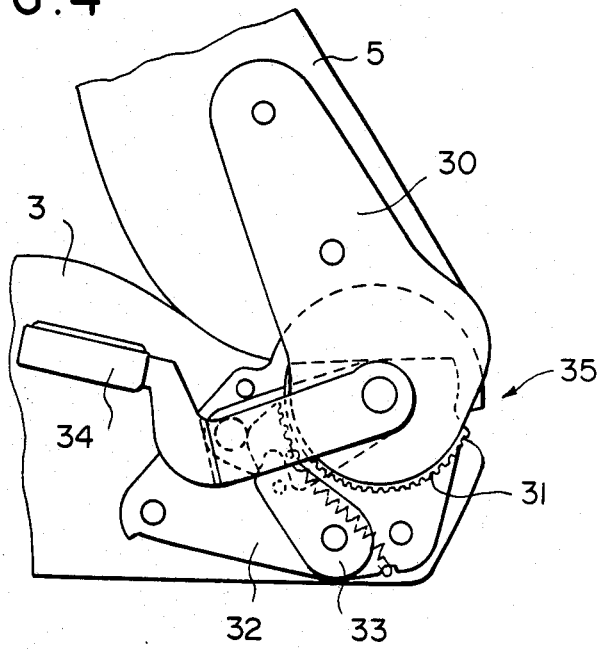

In the embodiment described above, the seat back lock is constituted by the lock pin 27 of the seat back 15 and the hook 26 releasably engaging with the lock pin 27 so as to releasably engage the seat back 15 with the upper bracket 22 of the reclining mechanism 14. FIGS. 3 and 4 show an ordinary reclining mechanism. As shown in FIGS. 3 and 4, a reclining mechanism 35 comprises a sector gear 31 which constitutes a reclining knuckle lock mechanism and which is fixed to an upper bracket 30, a lock gear 33 pivoted on a lower bracket 32 and capable of releasably engaging with the sector gear 31, and a reclining control lever 34 for releasably engaging the sector gear 31 with the lock gear 33 to adjust the angle of inclination of a seat back 5. Accordingly, when the seat is of the reclining type, the seat back lock of the present invention may be constituted similarly to that of the reclining mechanism 35. In this case, the seat in accordance with the present invention may be formed so that, for example, the reclining lock of the reclining mechanism 35 is released by an interacting member for detecting the disengagement between the lock piece 20 and the striker 21, i.e. the release of the seat bottom lock.

However, it should be noted that the present invention can also be applied to an automobile seat provided with no reclining mechanism.

Figure 5:
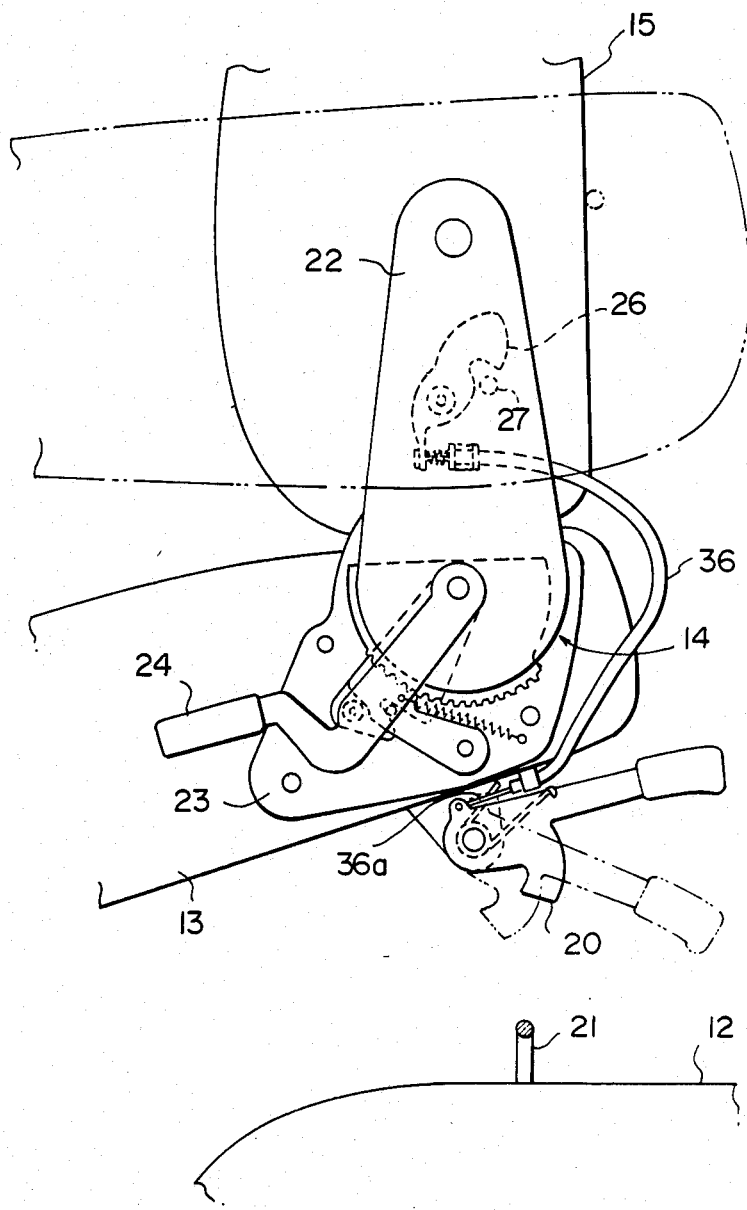
FIG. 5 is a side view showing another embodiment of the automobile seat in accordance with the present invention.

FIG. 5 shows another embodiment of the automobile seat in accordance with the present invention, in which a wire cable is employed for detecting the release of the seat bottom lock and releasing the seat back lock, instead of the rod 28 shown in FIGS. 2, 2A and 2B. In FIG. 5, similar elements are numbered with the same reference numerals with respect to FIGS. 2, 2A and 2B. As shown in FIG. 5, a wire cable 36 consists of an outer tube and an inner wire 36a. One end of the inner wire 36a is connected with the lock piece 20, and the other end with the hook 26. When the lock piece 20 is pulled up and disengaged from the striker 21, the inner wire 36a is pulled down to rotate the hook 26 counterclockwise. As a result, the hook 26 is disengaged from the lock pin 27, and the seat back 15 is can be folded on the seat bottom 13 as indicated by the two-dot chain line in FIG. 5. In essence, the protrusion on lock piece 20 connected to the inner wire 36a, the inner wire 36a and the protrusion on hook 26 connected to the inner wire 36a connect the hook portion of lock piece 20 and the hook portion of hook 26 for simultaneous actuation upon actuation of lock piece 20.

We claim:

1. An automobile seat comprising a seat bottom rotatable around a transverse axis approximately parallel to a car body floor up to a position where the rear portion of the seat bottom is free from the floor, a seat back inclinably mounted on said seat bottom, a seat bottom locking means for releasably locking the rear portion of said seat bottom to said floor so as to allow forward rotation of said seat bottom around said transverse axis when unlocked, a seat back locking means for releasably locking said seat back to said seat bottom, and an operating member, movable from a first position to a second position, connected to said seat bottom locking means and said seat back locking means by a connecting means for simultaneously releasing both said seat bottom locking means and said seat back locking means when said operating member is moved from said first position to said second position.

2. An automobile seat comprising a seat bottom rotatable around a transverse axis approximately parallel to a car body floor up to a position where the rear portion of the seat bottom is free from the floor, a seat back inclinably mounted on said seat bottom, a seat bottom lock for releasably locking the rear portion of said seat bottom to said floor as to allow forward rotation of said seat bottom around said transverse axis when unlocked, a seat back lock for releasably locking said seat back to said seat bottom, and a means for interlocking said seat bottom lock with said seat back lock in such a manner that, when said seat bottom lock is released, the other is simultaneously released in response thereto.

3. An automobile seat as defined in claim 2, wherein said seat bottom lock essentially consists of a striker fixed to said floor and a lock piece mounted on said seat bottom for engagement with said striker, said seat back is rotatably mounted on said seat bottom, said seat back lock is provided with a hook member for locking the rotation of said seat back, and said interlocking means is a linking member for transmitting the movement of one of said lock piece and said hook member to the other.

4. An automobile seat as defined in claim 3, wherein said seat bottom lock is provided with a grip for actuating said lock piece to disengage it from said striker, and said linking member being moved in response to the disengagement of said lock piece from said striker to then move said hook member to release said seat back lock.

5. An automobile seat as defined in claim 4, wherein said linking member is a rod rotatably mounted on said seat bottom.

6. An automobile seat as defined in claim 4, wherein said linking member is a cable connecting said lock piece with said hook member.

7. An automobile seat as defined in claim 3 wherein said seat back is mounted on said seat bottom via a reclining mechanism for adjusting the angle of inclination of said seat back in a plurality of steps, and said seat back lock is formed to releasably lock a knuckle bracket of said reclining mechanism to said seat back, said knuckle bracket and said seat back being rotatable with respect to each other.

8. An automobile seat as defined in claim 7, wherein said seat bottom lock is provided with a grip for actuating said lock piece to disengage it from said striker, and said linking member being moved in response to the disengagement of said lock piece from said striker to then move said hook member to release said seat back lock.

9. An automobile seat as defined in claim 2, wherein said seat back is rotatable around a transverse shaft so as to be completely folded forward on the seat bottom.

* * * * *